June 6, 1967 D. P. COOPER, JR 3,323,430
NONUNIFORMLY ILLUMINATED COMPARISON PHOTOMETER
Filed April 13, 1964 2 Sheets-Sheet 1

INVENTOR.
Dexter P. Cooper, Jr.
BY Brown and Mikulka
and
Donald M. Sandler
ATTORNEYS

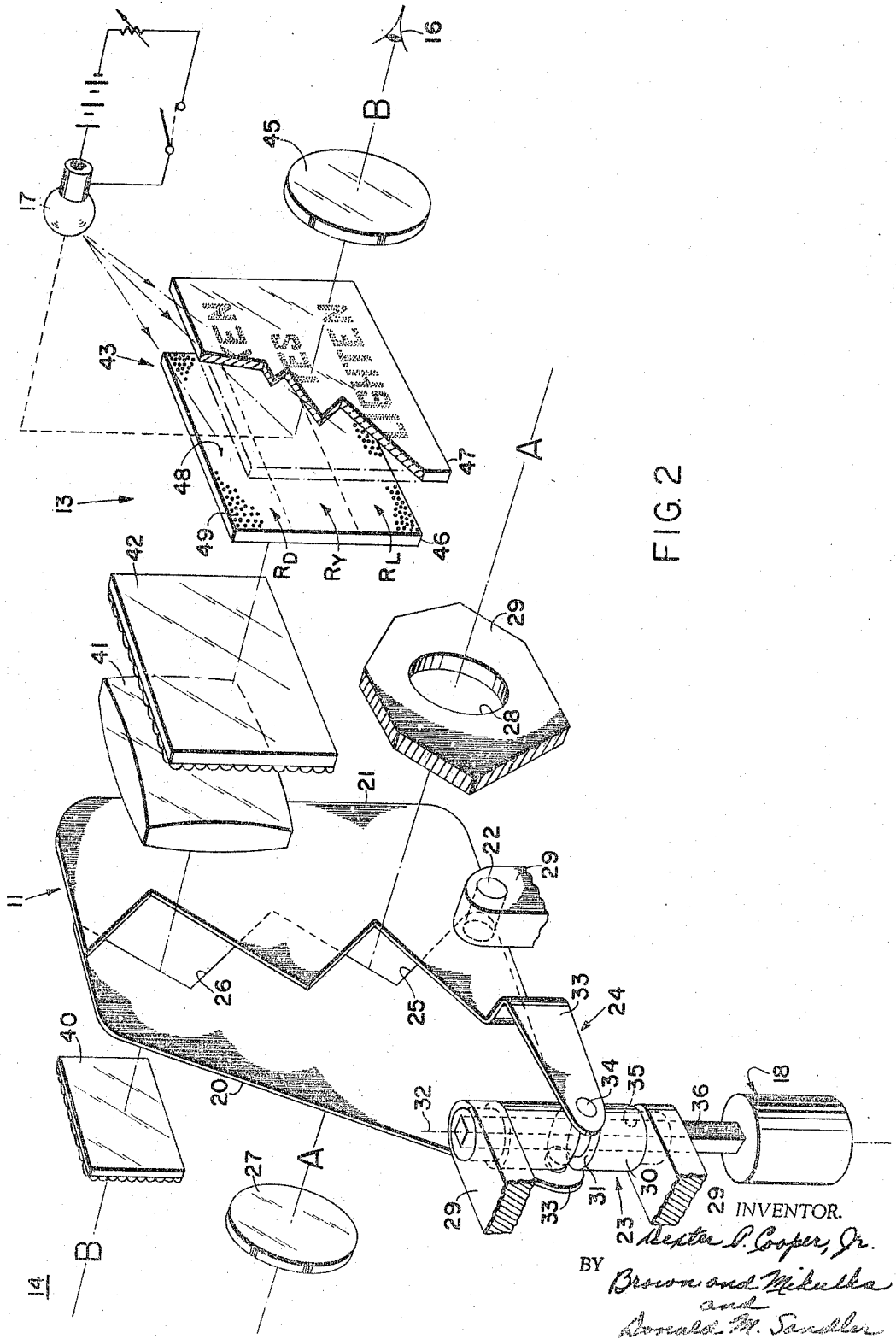

3,323,430
NONUNIFORMLY ILLUMINATED COMPARISON PHOTOMETER
Dexter P. Cooper, Jr., Lexington, Mass., assignor to Polaroid Corporation, Cambridge, Mass., a corporation of Delaware
Filed Apr. 13, 1964, Ser. No. 359,115
10 Claims. (Cl. 95—10)

This invention relates to cameras which utilize the balancing of a comparison photometer to establish the correct exposure value of the shutter mechanism, and more particularly to cameras of the type described wherein an index symbol associated with the photometer is uniquely intelligible at photometric balance.

In order to simplify construction of this type camera, a fixed speed shutter mechanism is frequently employed, with the exposure value of the mechanism being determined by an adjustable diaphragm contoured to provide an exposure aperture whose area depends upon the position of the diaphragm. Construction is further simplified when the balancing of the comparison photometer incorporated in such camera is accomplished by attentuating light from the scene being photographed until photometric balance is achieved with a source of known and fixed intensity. With this mode of operation, the diaphragm can be contoured to define a photometer aperture, in addition to the exposure aperture, such that adjustment of the diaphragm increases or decreases both apertures silmultaneously and by proportionate amounts. The position of the diaphragm, at which the photometer is balanced, and hence the area of the exposure aperture, will be related functionally to the level of brightness of the scene being photographed. With the shutter speed properly selected, film of a given speed can be properly exposed over a wide range of levels of scene brightness.

To facilitate achieving photometric balance, apparatus could be used such as that shown in the application of Edwin H. Land, Ser. No. 359,116, filed Apr. 13, 1964, and assigned to the same assignee as this application, wherein means are disclosed by which an index symbol becomes "uniquely intelligible" to an observer operating the photometer at the precise point of photometric balance. Previously known comparison photometers provided only a negative indication of photometric balance signaled by the disappearance of contrasting areas of brightness in the field of view that reversed in relative brightness on passing through balance. However, the novel photometer disclosed in the above-identified application provides a field of view wherein, on either side of photometric balance, a confusing background pattern rendered in contrasting levels of brightness is displayed such that a visible index symbol, in register with the background pattern, is camouflaged and rendered unintelligible. However, at balance, the background becomes uniformly bright and the index symbol is uniquely intelligible. Since the eye can easily resolve minor variations in brightness between adjacent areas, even a slight degree of photometric imbalance will cause the patterned background to become apparent to the observer. Thus, the term "uniquely intelligible" refers to a situation where the index symbol is seen against a uniformly illuminated background, or one that does not suggest a document pattern.

The above-described photometer requires light from the scene from photographed to pass through the variable photometer aperture and be incident on a diffuser thus providing a uniformly illuminated background, which defines a light source whose brightness can be matched with a known source. The brightness of the diffuser is thus dependent upon the average brightness of the scene (within the field of view of the photometer aperture). While the above-described photometer performs quite well when the subject is uniformly iilluminated and the background is about as bright as the subject, photographs of the subject deteriorate as the background begins to differ substantially in brightness from the subject. When the background fills a substantial portion of the field of view of the photometer and is much brighter than the subject (backlighting), underexposure of the subject usually results. On the other hand, a very much darker background will usually result in a photograph wherein the subject appears washed out. Of course manual corrections to the position of the diaphragm from the positon of photometric balance can be made, dependent upon the judgment of the observer; and the improvement attained depends to a large extent on such judgment, which experience shows varies markedly from person to person. Reducing the element of judgment involved in obtaining reasonably good photographs over a wide range of subjects and lighting conditions and using a comparison photometer would be of obvious value to the average photographer, and this constitutes the general and primary object of the present invention. More specifically, an object of the invention is to provide, in a comparison photometer, a positive indication to the observer when a predetermined change in exposure value from the average is obtained when the lighting conditions warrant such change.

Briefly, the invention contemplates that, generally, a subject that appears to an observer dark against bright background will be properly exposed when the exposure is increased (to make the photograph of the subject appear lighter) by about half a stop from the value based on the integrated or average scene brightness; and that, generally, a subject that appears to an observer as light against a dark background will be properly exposed when the exposure is decreased (to make the photograph of the subject appear darker) by about half a stop from the value based on the average scene brightness. Consequently, one index symbol with which the observer associates uniformly illuminated scenes will become uniquely intelligible to the observer when the diaphragm is positioned to achieve proper exposure under uniformly illuminated conditions. On the other hand, a second index symbol with which strong back-lighting is associated (i.e., the word "lighten") will become uniquely intelligible when the diaphragm is positioned to achieve about a half stop increase in exposure, etc.

To accomplish this, diffused light from the scene defines a uniformly illuminated background against which a reflective pattern illuminated by a standard light source can be viewed. When the brightness of the background matches the brightness of the pattern, the latter disappears and the field of view is uniformly illuminated. In a common field with the pattern and background are three spatially separated index symbols each of which is associated with a different one of the three possible lighting conditions, rendered visible in terms of a low density tone on a transparent support. However, the pattern is such that when visible, it camouflages the symbols; and associated with the pattern are means for causing it to have three regions (each of which covers a different index symbol) illuminated to a different extent by the standard light source. Thus, the background covering each region of the pattern will match the latter in brightness at three different average values of average scene brightness. Stated otherwise, for a given value of average scene brightness, there are three different photometer aperture areas at which each symbol will be uniquely intelligible.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIG. 2 is a perspective schematic view of the camera showing details of the comparison photometer;

Figure 3:
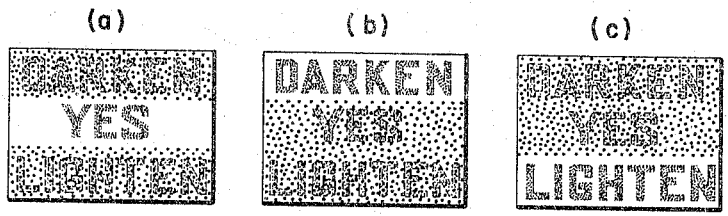
Figure 4:
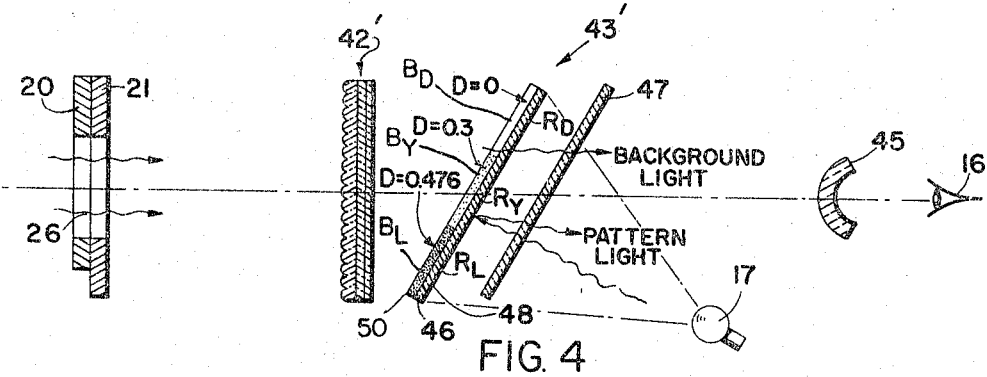

FIGS. 3(a), (b) and (c) are reproductions of what an observer would see under the three possible conditions of scene illumination; and FIG. 4 is a side schematic view of another embodiment of the photometer.

Figure 1:
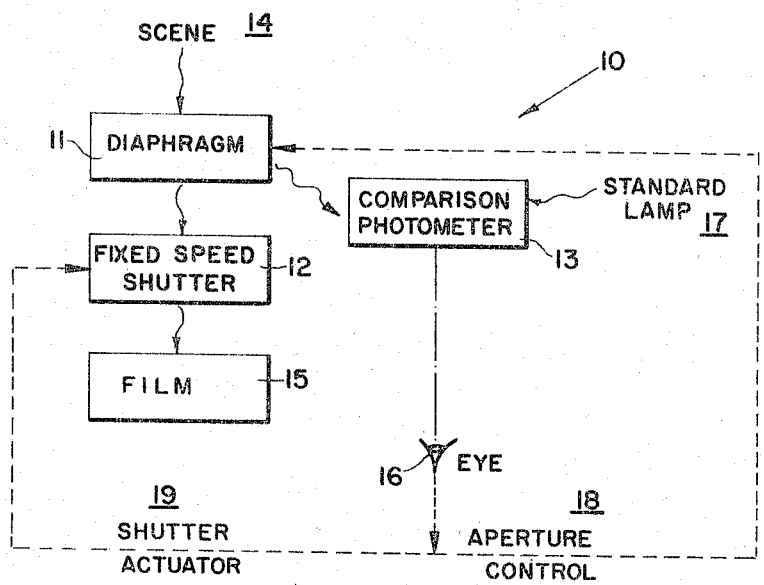
FIGURE 1 is a block diagram of a camera into which the present invention is incorporated.

Referring now to FIGURE 1, reference numeral 10 designates a camera system into which the present invention is incorporated. System 10 includes diaphragm means 11 having an exposure aperture aligned with fixed-speed shutter 12 and a photometer aperture aligned with comparison photometer 13 such that light from scene 14 being photographed on film 15 is applied to both the shutter and the photometer. The observer at 16, viewing light from the scene and from standard lamp 17 in a common field, operates aperture control means 18 which, as will be described in detail below, causes the exposure and photometer apertures to either decrease or increase simultaneously and by proportionate amounts, until the index symbol associated with the scene lighting conditions becomes uniquely intelligible. This establishes the exposure aperture area with which, in cooperation with the fixed speed shutter, correct exposure of the scene will be effected. With this done, observer 16 operates shutter actuator 19 which trips the shutter and causes exposure of film 15.

Details of diaphragm means 11 and photometer 13 are shown in FIG. 2, to which reference is now made. The diaphragm means comprises a pair of blades 20, 21 pivotally mounted together at 22 on camera housing 29, cam means 23, and connection 24 between the cam means and the two blades. Each of blades 20 and 21 are contoured along an edge adjacent the edge thereof containing pivot 22 to define exposure aperture 25 and photometer aperture 26. As shown in FIG. 2, exposure aperture 25 lies along the optical axis A—A between objective lens 27 and aperture 28 in the camera housing 29; and photometer aperture 26 lies along the axis B—B spaced from axis A—A, with axes A—A and B—B, and the axis of pivot 22 lying in the same plane. Cam means 23 may take the form of a cylindrical cam 30 containing circumferential groove 31 that defines a plane inclined relative to the axis 32 of the cam, the axial ends of which are of reduced diameter and rotatably mounted in bearings which are a part of housing 29. Each of blades 20 and 21 have extensions 33 projecting therefrom adjacent the region defining pivot 22 and terminating in free ends that lie adjacent diametrically opposite surfaces of cam 30, and contain followers 34 operatively engaged in groove 31.

Cam 30 may be provided with a square aperture 35 into which square shaft 36 is mounted, such that the rotation of knob 18, rigidly attached to one end of shaft 36, imparts rotation to the cam. As will now be evident, rotation of knob 18 imparts simultaneously but oppositely directed pivotal movement to blades 20 and 21. Thus, exposure aperture 25 and photometer aperture 26 are increased and decreased simultaneously and by proportionate amounts. It should also be noted that the ratio of the area of aperture 25 to the area of aperture 26 remains constant.

Comparison photometer 13 comprises front field lens 40, collecting lens 41, controlled diffuser 42, support means 43, standard lamp 17 and eyepiece 45. The field of the photometer is determined by lens 40 which is preferably a transparent support on one surface of which are a plurality of crossed cylindrical lenses. Lens 40 is physically adjacent objective 27 and is selected such that its field of view is substantially the same as the field of view of the objective. While lens 41, diffuser 42, and support means 43 are shown in FIG. 2 as aligned with aperture 26 and lens 40, additional clearance necessary to provide room for film 15 (not shown in FIG. 2) may be provided by using mirrors or other optical expedients to bend away from axis A—A, light incident on lens 40 and passing through aperture 26 such that eyepiece 45 can be physically located adjacent the viewfinder eyepiece (not shown) with which the observer can frame the scene to be photographed.

In any event, light passing through photometer aperture 26 is incident on diffuser 42 which may be constituted by a transparent support on one surface of which are cross lenticules, the pitch of which preferably has an order of magnitude of about 1/1000 inch. The reason for the provision of what is essentially a fine, crossed lenticular diffuser will be made clear after the operation of the photometer is described. Turning now to support means 43, the latter comprises a pair of superposed transparent supports 46 and 47. Surface 48 of support 46 is provided with a reflective pattern 49 distributed over the entire surface but only partially covering the same. The shape of the pattern is not important except that it must conceal, except under the conditions to be described, the intelligibility of indicia contained on transparent support 47 and rendered in terms of a low density tone. Support 47 is in superposed relationship to support 46 between the latter and eyepiece 45. As a result, observer 16 looking into eyepiece 45 sees, in a common field, the indicia contained on support 47 in registration with pattern 49 on support 46. The indicia and the pattern are seen against a uniformly illuminated background constituted by the light from diffuser 42 incident on the interstices of the pattern. Located at a point connected to the center of support 47 by a line inclined to the plane of the support is standard lamp 17 connected in series with a battery and switch such that the lamp illuminates at least pattern 49 when the switch is closed.

In the preferred form of the invention, support 47 contains the words "darken," "yes" and "lighten" vertically arranged with the word "yes" in the center. Thus, each of the three different and spatially separated index symbols can be associated with one of the three possible lighting conditions likely to be met by the average photographer. The term "yes" can be associated with a scene in which the subject is evenly illuminated and about as bright as the background so that, under these circumstances, the photographer would know that the shutter can be actuated to take a photograph when the term "yes" is intelligible in eyepiece 45. The term "darken" can be associated with a brightly lighted subject against a dark background (since the subject will have to be darkened to avoid the washed out appearance that results when the average brightness of the whole scene is used to control the diaphragm opening). Under these circumstances, the photographer would be instructed to actuate the shutter only after the term "darken" becomes intelligible. And lastly, the term "lighten" can be associated with a back-lighted subject (since the subject will have to be lightened to avoid underexposure that results when the average brightness of the whole scene is used to control the diaphragm opening). Under the last-described circumstance, the photographer would be instructed to actuate the shutter only after the term "lighten" becomes intelligible.

From the above, it is apparent that for a scene having a given average brightness, there are three possible photometer aperture areas (and hence exposure aperture areas available to the photographer). Preferably, the nominal aperture is correct for the uniformly illuminated scene, and the other two apertures differ from the nominal aperture by the same amount, namely about half a stop. The present invention results in the above-described operation because observer 16 sees the index symbol "darken" superimposed upon region $R_D$ of pattern 49, symbol "yes" superimposed upon region $R_Y$ of the pattern, and symbol "lighten" superimposed upon region $R_L$ of the pattern; but each of the different regions are illuminated to a different extent by standard lamp 17 since the latter acts as a point source that is a different distance from each region. Recalling that pattern 49 is reflective, it will now be appreciated that, relative to the brightness of the pattern in region $R_Y$ as seen by observer 16, the pattern in region $R_D$ will be brighter and the pattern in region $R_L$ will be darker. In order for the pattern associated with region $R_Y$ to disappear, which is to say that the pattern in this region appears to the observer to be as bright as the interstices between the pattern in this region, it is necessary for the knob 18 to be rotated until photometer aperture 26 has an area which bears a predetermined relation to the average brightness of the scene being photographed. This is the so-called nominal aperture area and would be correct for a uniformly illuminated scene. Observer 16 would see the index symbol "yes" against a uniformly illuminated background. Above and below region $R_Y$, observer 16 would see parallel bands of pattern 49 which serve to camouflage the other two index symbols as shown in FIG. 3(a). Since lamp 17 is closer to the pattern in region $R_D$ than to the pattern in region $R_Y$, the pattern in the former region would be brighter than the background which is constituted by light from diffuser 42 passing through the interstices of the pattern in region $R_D$. Thus, the observer would see the pattern as being light against a dark background and the index symbol "darken," while visible, would not be intelligible. Similarly, the pattern in region $R_L$ would appear dark against a light background since lamp 17 is more remote from region $R_L$ than region $R_Y$, and the index symbol "lighten" would not be intelligible.

In order for the pattern associated with region $R_D$ to disappear and the symbol "darken" to appear against a uniformly illuminated background, the "nominal" photometer aperture would have to be increased somewhat until the brightness of diffuser 42 is increased to the extent that the light from the diffuser passing through the interstices of the pattern in region $R_D$ is as bright as the light reflected from the pattern in this region. In such case, the patterns in regions $R_L$ and $R_Y$ would appear dark against a light background thereby camouflaging the other two index symbols as shown in FIG. 3(b). Similarly, the term "lighten" appears against a uniformly illuminated background when the nominal photometer aperture is decreased somewhat. In this case, the pattern in regions $R_D$ and $R_Y$ would appear light against a dark background thereby camouflaging the other two index symbols as shown in FIG. 3(c).

The nonuniform illumination of the three regions of the pattern can be accomplished by the use of a neutral density filter having discrete bands associated with the different regions, and by using a light source that acts as a point source that is substantially equidistant from surface 48 of support 46 carrying pattern 49. This embodiment is shown at 43′ in FIG. 4 wherein each of supports 46 and 47 is inclined somewhat to the optical axis so that lamp 17 uniformly illuminates pattern 49. Thus, the pattern in each region is uniformly bright. However, between support 46 and diffuser 42′, which is formed of two transparent sheets of lenticular film oriented so that the lenticules are crossed at right angles, is neutral density sheet 50 which has three density bands, $B_D$, $B_Y$ and $B_L$ overlying regions $R_D$, $R_Y$ and $R_L$, respectively. The density of $B_D$ may be zero, the density of $B_Y$ about 0.3 and the density of $B_L$ about 0.476 which would give ±½ stop variation relative to the nominal stop at which the term "yes" would be uniquely intelligible. In this embodiment, the backgrounds of the three regions of the pattern (defined by the interstices thereof) are nonuniformly illuminated, but the operation is substantially the same as already described. Thus, the term "yes" is uniquely intelligible only when the background in the region $R_Y$ is as bright as the pattern in this region; the other terms being unintelligible since the background in the region $R_D$ is brighter than the pattern in this region, and the background in the region $R_L$ is darker than the pattern in this region, etc.

It should be appreciated that with the above-described arrangement, the nominal brightness of diffuser 42 (i.e., the brightness at which the term "yes" is uniquely intelligible) is always adjusted by means of the diaphragm to the same value regardless of the average scene brightness (within the design range of the apparatus). In other words, for a brightly lit outdoor scene with an exposure value of perhaps 20, photometer aperture 26 would have its smallest area to cause diffuser 42 to have the same brightness as when aperture 26 has its largest area corresponding to a scene whose exposure value is perhaps 10. The nominal brightness of the diffuser is thus determined by the largest photometer aperture, and the current through lamp 17 is determined by this condition.

A crossed lenticular diffuser is used at 42 (and at 42′) rather than a conventional frosted glass type of diffuser because the former scatters incident light through less of a solid angle than the latter. This is important because the size of photometer aperture 26 varies between wide limits (i.e., as much as 10 stops or a ratio of areas of 4096) which means that when the scene brightness is at one extreme (brightest design condition), only a small central area of the diffuser is illuminated; while when the brightness is at the other extreme (darkest design condition), a substantially larger area of the diffuser is illuminated. If the light incident on the diffuser were scattered through a large solid angle, only a small portion of the light incident on the diffuser under low scene illumination would reach the observer at 16. This would cause the background, against which pattern 49 is viewed, to be less bright than would be the case were there a linear relationship between the area of the photometer aperture and the brightness of the diffuser. On the other hand, if the light incident on the diffuser were scattered through a small angle, the diffuser would not be uniformly illuminated under brightly lighted scene conditions. Thus, a compromise is necessary, and the best compromise appears to be the crossed lenticular diffuser previously described.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. In a camera having shutter apparatus actuatable to effect exposure, the combination of:
   (a) diaphragm means positionable to change, simultaneously and by proportionate amounts, an exposure aperture and a photometer aperture;
   (b) diffuser means to scatter light passing through said photometer aperture for defining a background area of substantially uniform illumination, the level of which is functionally related to the position of said diaphragm means;
   (c) means defining a reflective pattern and a plurality of index symbols;

(d) mounting means for bringing said background area, said reflective pattern and said index symbols into a common field;

(e) a second light source for illuminating said pattern;

(f) said pattern and said symbols being arranged so as to only partially cover said background area and to cause each of said symbols to become uniquely intelligible only at predetermined different relationships between the level of brightness of said background area and the level of brightness of said pattern, whereby the particular symbol that is uniquely intelligible depends upon the particular position of said diaphragm means.

2. Apparatus in accordance with claim 1 wherein said diaphragm means has a position at which the brightness of said background area is photometrically balanced with the level of brightness of said pattern, there being one index symbol uniquely intelligible at such position.

3. Apparatus in accordance with claim 2 wherein:
(a) said diaphragm means has a second position at which the brightness of said background area is greater than the brightness of said pattern by a first predetermined amount, there being a second index symbol uniquely intelligible at such second position; and
(b) said diaphragm means has a third position at which the brightness of said background area is less than the brightness of said pattern by a second predetermined amount, there being a third index symbol uniquely intelligible at such third position.

4. Apparatus in accordance with claim 3 wherein the magnitudes of said first and second predetermined amounts are equal.

5. Apparatus in accordance with claim 4 wherein:
(a) a first transparent support, one surface of which is provided with said reflective pattern;
(b) a second transparent support superposed on said first support adjacent the surface thereof provided with said reflective pattern, said second support containing said index symbols rendered visible thereon in low density tones; and
(c) a neutral density filter interposed between said first light source and said first transparent sheet constructed and arranged to have different densities overlying the first-mentioned symbol and said second and third symbol.

6. Apparatus in accordance with claim 5 wherein:
(a) said diffuser means is constituted by a pair of transparent sheets, one surface of each of which is provided with a plurality of lenticules; and
(b) said sheets being oriented so that the lenticules of one sheet are crossed with the lenticules of the other sheet.

7. A photometric device by which the brightness of two light sources can be compared comprising:
means defining a field of view containing a plurality of index symbols occupying different regions of a composite background pattern of discrete areas for said symbols, said index symbols and said composite pattern being constructed and arranged to render any one of said symbols as the dominant perceptible element in its region of said field of view when its associated region of said background pattern exhibits a low brightness contrast and to render said pattern as the dominant perceptible element in any region of said field of view when exhibiting a high brightness contrast; and
means for differentially illuminating the discrete areas of said background pattern with light from said two sources and for establishing from region to region of said background pattern a lightness gradient due to one of said sources;
means for adjustably varying the relative proportions of light incident on said pattern from said sources to alter the brightness contrast between the discrete areas of said background pattern in each of said regions,
the perceptibility of each of said index symbols being suppressed by the dominance of said background pattern when the latter exhibits a relatively high contrast in the region of said pattern associated therewith, but becoming uniquely perceptible against its region of said background pattern when the contrast of said background pattern areas in its region is low at substantial photometric balance,
whereby each of said index symbols becomes uniquely intelligible in said field of view at a different predetermined relationship between the proportions of light incident on said pattern from said sources.

8. A photometric device by which the brightness of two light sources can be compared comprising:
means defining a plurality of index symbols occupying different regions of a composite pattern of discrete areas forming a background for said symbols in a field of view, said index symbols and said composite pattern being constructed and arranged to render each symbol perceptible against its region of said background pattern in terms of differences in brightness between said symbol and the discrete areas of its region;
means for differentially illuminating said discrete areas of said background pattern with light from said two sources, thereby rendering said discrete areas in each of said regions in contrasting levels of brightness to suppress the apparent differences in brightness between said symbols and said background pattern, said means establishing from region to region of said pattern a gradient in the illumination due to one of said sources;
means for varying the relative proportions of light incident on said pattern from said sources to effect a photometric balance in brightness between the discrete areas of each of said regions selectively, thereby causing each index symbol in one to be uniquely intelligible against said background only at substantial photometric balance between the discrete areas in its region of said pattern and, at photometric imbalance between the discrete areas in a region, suppressing the intelligibility of the symbol therein by virtue of the constrasting levels of brightness of the discrete areas in its region of said pattern,
whereby the particular symbol that is uniquely intelligible depends upon the relative proportions of light incident on said pattern from said sources.

9. A photographic camera having an exposure aperture for photographing a field of view comprising:
adjustable exposure control means for varying the amount of light admitted through the exposure aperture of said camera during an exposure;
a reference light source;
means defining a field of view containing a plurality of index symbols each occupying a different region of a composite background pattern of discrete areas for said symbols, said index symbols and said composite pattern being constructed and arranged to render any one of said symbols as a dominant perceptible element in said field of view when its region of the background pattern exhibits a low brightness contrast and to render said pattern as a dominant perceptible element in any region of said field of view when the pattern therein exhibits a high brightness contrast;
means for differentially illuminating said different regions of said background pattern with light from said reference light source and from a source of light derived from said field of view and for establishing a gradient in the light illuminating said pattern from one of said sources;
means responsive to the adjustment of said exposure control means for adjustably varying the relative proportions of light incident on said different regions of said pattern from said sources to alter the brightness contrast between the discrete areas of said background pattern in each of said regions, the perceptibility of each index symbol being suppressed by the dominance of the background pattern in its region thereof when the latter exhibits a relatively high contrast, but becoming uniquely perceptible in its region of said background pattern when the contrast of said background pattern areas is low, each of said symbols being uniquely intelligible at a different setting of said exposure control means.

10. A comparison photometer comprising:
a first light source defining a background area of substantially uniform illumination;
a first transparent support, one surface of which is provided with a reflective pattern partially covering said background area to provide a composite pattern;
a second transparent support superposed relative to said first support adjacent the surface thereof provided with said reflective pattern, said second support containing a plurality of index symbols rendered visible thereon in low density tones;
a second light source for illuminating said reflective pattern; and
a neutral density filter interposed between said first light source and said first transparent sheet constructed and arranged to have different densities overlying each of said symbols,
said reflective pattern and said index symbols being constructed and arranged to render each of said symbols uniquely intelligible only at predetermined different relationships between the level of brightness of said background area and the level of brightness of said reflective pattern.

References Cited

UNITED STATES PATENTS

| | | | |
|---|---|---|---|
| 2,112,701 | 3/1938 | Leitz | 95—10 |
| 2,246,817 | 6/1941 | Sauer | 88—23 |

NORTON ANSHER, *Primary Examiner.*

J. F. PETERS, JR., *Assistant Examiner.*